United States Patent Office 3,582,391
Patented June 1, 1971

3,582,391
PAPER COATED WITH FORM CONTAINING
IMAGE FORMING MEANS
Joseph W. Keil, Midland, Mich., assignor to
Dow Corning Corporation, Midland, Mich.
No Drawing. Division of application Ser. No. 451,617,
Apr. 28, 1965, now Patent No. 3,511,788, which is a
continuation of application Ser. No. 430,193, Feb. 3,
1965, which in turn is a continuation-in-part of application Ser. No. 319,512, Oct. 28, 1963. This application Aug. 27, 1969, Ser. No. 853,476
Int. Cl. B41m 5/22
U.S. Cl. 117—36.2    5 Claims

ABSTRACT OF THE DISCLOSURE

Paper is disclosed which is coated on one side with a combination of (A) a cured, open-celled, foam composition comprising (1) a plastisol and (2) a copolymer of $SiO_2$ units and units selected from the group consisting of $(CH_3)_3SiO_{1/2}$ and $Q(CH_3)_2SiO_{1/2}$ units, wherein Q is a radical containing a solubilizing group that makes the copolymer compatible with the plastisol, and the ratio of $SiO_2$ units to the total $(CH_3)_3Si$ and $Q(CH_3)_2Si$ units is in the range of 1:0.6 to 1:1.2, and (B) an essentially colorless material capable of reacting upon contact with a second essentially colorless material to produce a colored image, the other side of the paper containing said second essentially colorless material.

---

This invention relates to foams, compositions for making foams, a method for making foams and foam covered substrates.

This application is a division of application Ser. No. 451,617, filed Apr. 28, 1965, now U.S. Patent 3,511,788 which application is a continuation of abandoned application Ser. No. 430,193, filed Feb. 3, 1965, and entitled "Foams, Compositions, Method For Making Foams and Foam Covered Substrate," which in turn is a continuation-in-part of abandoned application Ser. No. 319,512, filed Oct. 28, 1963 and entitled "Foams and Compositions and Method for Making Foams."

More particularly this invention relates to compositions for making foams comprising (1) a material selected from the group consisting of (a) organic liquids having a surface tension of at least 22.2 dynes per centimeter at 20° C. when in contact with air, and (b) plastisols and (2) a copolymer of $SiO_2$ units and units selected from the group consisting of $(CH_3)_3SiO_{1/2}$ and $Q(CH_3)_2SiO_{1/2}$ units, wherein Q is a radical containing a solubilizing group and the ratio of $SiO_2$ units to the total $(CH_3)_3Si$-- and $Q(CH_3)_2Si$-units is in the range of 1:0.6 to 1:1.2, said copolymer being compatible with said organic liquid or plastisol and being present in a foam forming amount.

The method of this invention for making the foams comprises expanding the composition defined above with a gas.

This invention also relates to the foams which are made from the compositions and by the method set forth above.

This invention further relates to a process of preparing a foam which comprises adding to a material selected from the group consisting of (a) organic liquids having a surface tension of at least 22.2 dynes per centimeter at 20° C. when in contact with air, and (b) plastisols, a copolymer of $SiO_2$ units and units selected from the group consisting of $(CH_3)_3SiO_{1/2}$ and $Q(CH_3)_2SiO_{1/2}$ units, wherein Q is a radical containing a solubilizing group and the ratio of $SiO_2$ units to the total $(CH_3)_3Si$ and $Q(CH_3)_2Si$ units is in the range of 1:0.6 to 1:1.2 in a foam forming amount, said copolymer being compatible with said organic liquid or plastisol and then expanding said organic liquid or plastisol with a gas.

This invention also relates to an article of manufacture which is a substrate coated with a cured, open-celled, foam composition comprising (1) a plastisol and (2) a copolymer of $SiO_2$ units and units selected from the group consisting of $(CH_3)_3SiO_{1/2}$ and $Q(CH_3)_2SiO_{1/2}$ units, wherein Q is a radical containing a solubilizing group that makes the copolymer compatible with the plastisol, and the ratio of $SiO_2$ units to the total $(CH_3)_3Si$ and $Q(CH_3)_2Si$ units is in the range of 1:0.6 to 1:1.2.

The invention still further relates to a substrate, and particularly a paper, coated with about 1 to 10 mils of a cured, open-celled foam. So far as is known, heretofore no one has been able to apply such a thin layer of an open-celled foam to paper. A particularly unique, and sometimes very important, characteristic of the foams applied to the substrates is that they can be made open-celled at the surface (e.g. porous) as well as being open-celled internally. However, it is also possible to make open-celled foams in accordance with this invention which have a surface skin.

The compositions and methods of this invention are useful for preparing foams which in turn have numerous uses. For example, foams from the organic liquids are useful as solvent cleaners and applying a thin layer of solvent over a large area. The foam from the plastisols are useful as cushioning annd padding in furniture, bedding, transportation seating, etc. Foams from the plastisols can also be used to make gaskets, filters, shock mountings, cleaning sponges, brassiere shapes, toys, wall coverings, insulation, laminated structures, clothing and apparel padding, and automotive crash fronts.

The substrates, and particularly paper, coated with the foams of this invention find numerous uses. For example, such articles of manufacture are useful as non-slip napkins, bed sheets, cleaning towels and magazine paper (which can be printed or screened) where an increased bulk but essentially no increase in weight is desired. These articles are also useful as filters for cigarettes, automobile air filters, air-conditioning systems (both heating and cooling) in homes and industry, fuel filters and broadly for almost any gas or liquid. The coated substrates can also be used in packaging as a cushioning and/or insulation material. They can further be used as fabric liners and as fillers between fabrics.

The foam on the substrate can be employed as a carrier for other materials such as antiseptics or medicinals, burn ointments, detergents and microencapsulated ink which articles would be useful as bandages, burn dressings, cleaning towels or pads, and carbonless carbon paper respectively. These uses are illustrative of those wherein an open-celled surface on the foam can be very important or even essential. The term "microencapsulated ink" is intended to include a colored ink per se which has been incorporated in or "encapsulated by the foam as well as colorless dyes or chemicals which are developed into a colored material when brought in contact with the proper reactant. The ink or dye can alternatively be incorporated or encapsulated prior to its addition into the foam if so desired. The latter types of carbonless carbon papers, without the foam, are known and are described for example in U.S. Patents 2,548,366; 2,800,457; and 2,800,458.

Other uses of the compositions, foams and coated substrates of this invention will be obvious to those skilled in the art.

The process of this invention is also useful in air drilling and hydrocarbon liquid removal from gas wells.

Any substrate can be covered or coated with the foams made in accordance with this invention. Thus, for example, the substrate can be metal, glass, fabric (woven or non-woven), wood, plastic, paper, porcelain or ceramic. The substrate can be porous or non-porous in nature and the term "coated" as employed herein is intended to include the impregnation of a material per se or in conjunction with a surface coating as well as surface coating per se.

The copolymers employed in this invention are well-known materials. They can be prepared by the cohydrolysis of $(CH_3)_3SiX$ and/or $Q(CH_3)_2SiX$ with $SiX_4$, wherein X is a hydrolyzable radical such as a halogen (chlorine, fluorine, bromine) or an alkoxy (methoxy, ethoxy, propoxy, butyoxy, etc.) radical, employing, of course, such proportions as are necessary to obtain the desired $SiO_2$ to total $(CH_3)_3Si$ and $Q(CH_3)_2Si$ ratio of 1:0.6 to 1:1.2. Alternatively, a copolymer can be prepared, for example, by reacting

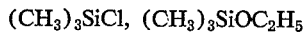$(CH_3)_3SiCl$, $(CH_3)_3SiOC_2H_5$ or

$(CH_3)_3SiOSi(CH_3)_3$ with an acidic silica sol. Such a method is fully described in U.S. Pat. 2,676,182, the disclosure of said patent being incorporated herein by reference.

A particularly useful means for preparing modified copolymers containing both

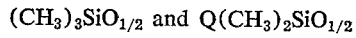$(CH_3)_3SiO_{1/2}$ and $Q(CH_3)_2SiO_{1/2}$ units comprises cohydrolyzing a mixture of $(CH_3)_3SiX$ and $H(CH_3)_2SiX$ with $SiX_4$ and then coupling the desired solubilizing group Q to the copolymer by reacting the hydrogen on the silicon with the unsaturated group of a compound that also contains the desired solubilizing group. This type of reaction is well known to those skilled in the art and is illustrated in the examples. The purpose of the solubilizing group in the radical Q is to make the copolymer compatible with organic liquids or plastisols which it might not be compatible with otherwise. Any solubilizing group can be employed in the copolymers of this invention, the particular organic liquid or plastisol in which the copolymer is to be placed determining the choice of solubilizing group. Examples of solubilizing groups that can be employed in the Q radical are the carboxyl, ester, amide, amino, mercapto, halohydrocarbon, nitrile, nitro, carbonyl and higher hydrocarbon groups.

The essential characteristics of the copolymer (2) as defined above are the siloxane units present, the ratio of these siloxane units and the compatibility of the copolymer with the organic liquid or plastisol. By being "compatible" it is meant that the copolymer is at least partially soluble and/or dispersible in the organic liquid or plastisol. The copolymer can also be completely soluble or dispersible in the organic liquid or plastisol. So far as is known at this time, it is believed that when one wants the most stable foam the copolymer is preferably only partially soluble or dispersible rather than completely so. The compatibility of the copolymer in a particular system, for example a plastisol, can be controlled in several ways. By way of illustration, one can choose a particular copolymer within the above definition which has the desired degree of compatibility. Another alternative is to alter the copolymer by the Q radical present and thus control the degree of compatibility. Still another alternative is to select a plasticizer for use in the plastisol which gives the desired degree of compatibility. Thus it can be seen from the foregoing illustrations that the instant invention has a maximum amount of flexibility which permits tailoring the compositions and products made therefrom to individual specifications and needs rather than vice versa.

The amount of copolymer used need only be sufficient to cause foaming and can vary from one medium to another. The amount will also vary depending on the particular application. The copolymer can be used in any amounts from a trace amount to quite large amounts but is preferably used in an amount from 0.1 to 4% by weight based on the weight of the organic liquid or plastisol. More than 4% can be used but is not preferred for economic reasons.

The copolymer can be used to foam any non-silicone organic liquid having a surface tension of at least 22.2 dynes per centimeter at 20° C. when in contact with air and with which it is compatible. The term "non-silicone organic liquid" as used herein includes any simple or complex liquid reaction products, such as liquid epoxy resins, as well as pure compounds and mixtures of compounds as long as they have the specified surface tension. Illustrative of the non-silicone organic liquids that can be foamed are acetic acid, formic acid, n-butyric acid, isobutyric acid, oleic acid, o-xylene, benzene, cyclohexane, toluene, methyl benzoate, methyl acetate, ethyl nitrate, ethyl formate, ethyl acetate, ethyl aceto acetate, ethyl cinnamate, methyl propionate, methyl formate, n-propyl acetate, ethylene glycol, glycerol, benzyl alcohol, ethyl alcohol, n-octyl alcohol, phenol, allyl alcohol, n-butyl alcohol, bromoform, choroform, bromobenzene, chlorobenzene, carbon tetrachloride, ethylene chloride, methylene chloride, methylene iodide, tetrabromoethane, ethylene oxide, methylethylketone, acetone, benzophenone, quinoline, N-methylaniline, ethylaniline, dimethylaniline, n-propylamine, benzylamine, pyridine, o-toluidine, triphenylphosphine, tristearin, allyl isothiocyanate, diethylcarbonate, ethyl mercaptan, benzonitrile, nitroethane, nitrobenzene, paraldehyde, benzaldehyde and furfural.

The plastisols which can be formed with the copolymer are well-known materials. Plastisols are simply mixtures of a particulate thermoplastic vinyl resin, such as polyvinyl chloride or a resinous copolymer of a major portion of vinyl chloride and a minor portion of a copolymerizable monomer such as vinyl acetate, and a high boiling organic liquid plasticizer which is substantially a non-solvent for the particulate resin at ordinary temperatures but is capable of dissolving the resin at elevated temperature to form a single phase material which upon cooling to ordinary temperature is a solid material having good physical properties. For more detailed information on plastisols, reference is made to the article "Plastisols and Organosols" by E. G. Partridge et al. in "Rubber Age," volume 67, pages 553–560 (August 1950); the article "Compounding Plastisols for Specific Applications" by Clark et al. in "Rubber Age," volume 72, pages 343–349 (December 1952); and pages 170–186 of the book, "The Technology of Solvents and Plasticizers" by A. K. Doolittle, published in 1954 by Wiley. This invention is applicable to any of the ordinary plastisols and the term "plastisol" as used herein is intended to include "modified plastisols" i.e., plastisols containing up to 10% by weight of an organic thinner or diluent such as naphtha, this percentage being based on the sum of the resin and the plasticizer in admixture therewith. The plastisol will usually consist of the particulate vinyl resin and from 50 to 150 parts (per 100 parts of resin) of high boiling organic liquid plasticizer, together with small amounts of conventional additives such as stabilizers, pigments, etc. Specific examples of suitable plasticizers, stabilizers, pigments, etc. are disclosed in the articles and book referred to above and numerous other places in the literature and hence no useful purpose would be served by listing them again here.

The particular method by which the organic liquid or plastisol containing the copolymer is expanded with a gas will depend on available equipment and individual preferences. The numerous ways in which gas is incorporated into materials to foam them are well known in the art. These ways include, for example, the chemicals which release a gas under the desired conditions and called blowing agents in the art; bubbling a gas into the material; and mechanically beating air or another gas into the material. Of course combinations of these methods can also be employed.

EXAMPLE 1

In four separate bottles 30 g. of isopropyl alcohol, octane, methyl alcohol and nonane were placed. These liquids have surface tensions of 21.7, 21.8, 22.6 and 22.9 dynes per centimeter respectively at 20° C. when in contact with air. To each of these liquids 0.35 g. of a copolymer of $SiO_2$ and $(CH_3)_3SiO_{1/2}$ in which the ratio of $SiO_2$ units to $(CH_3)_3Si$ units was in the range of 1:0.6 to 1:1.2 was added. Each of the bottles was then vigorously shaken. Neither the isopropyl alcohol or octane foamed whereas both the methyl alcohol and nonane did foam. This example shows that organic liquids having surface tensions of less than 22.2 dynes per centimeter are not foamed by the copolymer but organic liquids having a surface tension of at least 22.2 dynes per centimeter are foamed by the copolymer.

EXAMPLE 2

200 g. of kerosene was placed in each of two 1,000 ml. graduates. To the first graduate a copolymer of $SiO_2$ and $(CH_3)_3SiO_{1/2}$ in which the ratio of $SiO_2$ units to $(CH_3)_3Si$ units was in the range of 1:0.6 to 1:1.2 was added. To the second graduate a copolymer identical to the other was added except that it had been treated with $(CH_3)_3SiCl$. The treatment consisted of adding 1.25% of $(CH_3)_3SiCl$ to a solution of the copolymer in xylene (60% solids). The mixture was refluxed for about 4 hours and then cooled. Another 1.25% of $(CH_3)_3SiCl$ was added to the mixture, then it was refluxed for about 6 hours and again cooled. The mixture was then heated to reflux again and then the xylene was distilled off at 143° C. Finally, 100 cc. of xylene was added to the product and the mixture heated to 143° C. to distill off the xylene. There was 0.1% silicone solids added to each of the graduates. A diffusion stone was placed in the bottom of the graduates and nitrogen bubbled through it at the rate of about 120 ml. per minute. In the first graduate, after 5 minutes of bubbling, 39 ml. of the kerosene had been converted to foam. The foam had a volume of 424 ml. In the second graduate containing the treated copolymer, after 5 minutes of bubbling, 56 ml. of the kerosene had been converted to foam. The foam had a volume of 571 ml.

EXAMPLE 3

A plastisol consisting of 40 g. of a vinyl chloride polymer, 40 g. of a polyester plasticizer and 4 g. of a nitrogen producing blowing agent consisting of 70% N,N'-dimethyl-N,N'-dinitrosoterephthalamide and 30% white mineral oil was prepared. Another plastisol identical to the first was prepared except that it also contained 4 g. of a 10% (solids) solution in xylene of a copolymer of $SiO_2$ and $(CH_3)_3SiO_{1/2}$ in which the ratio of $SiO_2$ units to $(CH_3)_3Si$ units was in the range of 1:0.6 to 1:1.2. The two plastisols were poured into two small identical cans and then placed in a 104° C. oven and allowed to expand. After 10 minutes the cans were removed and placed in a 175° C. oven for 5 minutes. The height of the foam containing the copolymer was 25/32 of an inch as compared to 15/32 of an inch for the foam without the copoymer.

EXAMPLE 4

A one-shot foam was made by first mixing 7.5 g. of refined tall oil, 2.5 g. of N,N,N',N'-tetrakis(2-hydroxypropyl)ethylenediamine and 2.5 g. of trichlorofluoromethane and then adding 7 g. of $OCNC_6H_4CH_2C_6H_4NCO$. The mixture was poured into a bottle and a foam 2⅝ inches in height obtained. The foam contained numerous open and large cells on the top and sides. Another one-shot foam identical to the first was prepared except that 0.2 g. of a 10% (solids) solution in xylene of a copolymer of $SiO_2$ and $(CH_3)_3SiO_{1/2}$ in which the ratio of $SiO_2$ units and $(CH_3)_3Si$ units was in the range of 1:0.6 to 1:1.2 was also mixed with the first three ingredients prior to the addition of the isocyanate. When this mixture was poured into a bottle identical to the first one a foam having a height of 3 1/16 inches was obtained. This foam has cells which were uniform in size.

EXAMPLE 5

A plastisol consisting of 200 g. of dibutyl phthalate, 200 g. of a vinyl chloride polymer and 10 g. of a 10% (solids) solution of a copolymer of a copolymer of $SiO_2$,

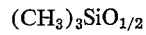

and

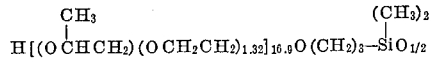

units in which the ratio of $SiO_2$ units to total $(CH_3)_3SiO$ and

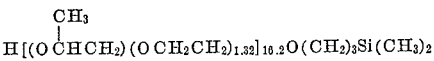

units was in the range of 1:0.6 to 1:1.2. The copolymer was prepared by mixing 156.2 g. (60% solids) of a solution in toluene of a copolymer of $SiO_2$, $(CH_3)_3SiO_{1/2}$, and $(CH_3)_2HSiO_{1/2}$ units in which the ratio of $SiO_2$ units to total $(CH_2)_3Si$ and $(CH_3)_2HSi$ units was in the range of 1:0.6 to 1:1.2, 176.3 g. of

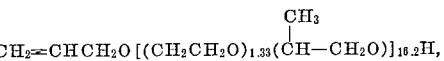

237.5 g. of xylene and 0.4 g. of a 1% solution of platinum (as chloroplastinic acid) in dimethylphthalate. The mixture was refluxed at 132–134° C. for about 24 hours. The mixture was then cooled, filtered and evaporated to dryness. The product was a soft wax.

A medium fritted glass filter was placed in the bottom of the mixture of plastisol and this waxy siloxane and air was blown in to make a foam. The foam formed was taken and placed in a 175° C. oven for about 3 minutes. The foam had a density of 16 pounds per cubic foot. No foam could be made from an identical composition that did not contain the copolymer.

EXAMPLE 6

A plastisol consisting of 50 g. of octyldecyl phthalate, 50 g. of a homopolymer of vinyl chloride having a specific gravity of 1.4, an apparent density of 15 pounds per cubic foot and an average particle size of 1.7 microns and 2 g. of p,p'-oxybis-(benzenesulfonyl hydrazide), a nitrogen-type blowing agent. Another plastisol identical to the first one was prepared except that it also contained 1 g. of a copolymer of $SiO_2$, $(CH_3)_3SiO_{1/2}$ and

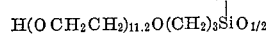

units in which the ratio of $SiO_2$ units to the total $(CH_3)_3Si$ and $H(OCH_2CH_2)_{11.2}O(CH_2)_3Si(CH_3)_2$ units was in the range of 1:0.6 to 1:1.2. The copolymer was prepared by mixing 174.4 g. (60% solids) of a solution in toluene of a copolymer of $SiO_2$, $(CH_3)_3SiO_{1/2}$ and $(CH_3)_2HSiO_{1/2}$ units in which the ratio of $SiO_2$ units to total $(CH_3)_3Si$ and $(CH_3)_2HSi$ units was in the range of 1:0.6 to 1:1.2, 55.3 g. of $CH_2=CHCH_2O(CH_2CH_2O)_{11.2}H$, 120.3 g. of xylene and 0.3 g. of a 1% solution of platinum (as chloroplatinic acid) in dimethylphthalate. The mixture was refluxed at 128–130.2° C. for about 24½ hours. The mixture was then cooled, filtered and evaporated to dryness. The product was a hard wax.

A 3.2 g. sample of the first plastisol mixture was poured into a can and a 3.0 g. sample of the second mixture which contained the copolymer was poured into an identical can. Both cans were placed in a 160° C. oven for about 5 minutes. The first mixture yielded a foam having a height of 4/32 of an inch as compared to the foam from the mixture containing the polymer which had a height of 9/32 of an inch.

EXAMPLE 7

Two mixtures were prepared. The first mixture consisted of 10 grams of a low molecular weight liquid epoxy resin prepared by the reaction of bisphenol A and epichlorohydrin [1] and ten drops of a solution in xylene (50% solids) of a copolymer of $SiO_2$ and $(CH_3)_3SiO_{1/2}$ units in which the ratio of $SiO_2$ units to $(CH_3)_3Si$ units was in the range of 1:0.6 to 1:1.2. The second mixture consisted of 10 grams of the same resin and 10 drops of a solution in xylene (50% solids) of a copolymer of $SiO_2$, $(CH_3)_3SiO_{1/2}$ and

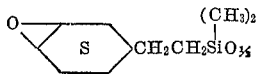

units in which the ratio of $SiO_2$ units to total $(CH_3)_3Si$ and

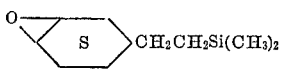

units was in the range of 1:0.6 to 1:1.2. This copolymer was prepared as follows: In a one liter, three-necked flask equipped with stirrer, plug and Dean Stark trap, there was placed 18.5 grams (.15 mol) of vinylcyclohexene oxide, 168.8 grams of a copolymer of $SiO_2$, $(CH_3)_3SiO_{1/2}$ and $H(CH_3)_2SiO_{1/2}$ units in which the ratio of the $SiO_2$ units to total $(CH_3)_3Si$ and $H(CH_3)_2Si$ units was in the range 1:0.6 to 1:1.2, 52 grams of xylene, 30 ml. of xylene for the Dean Stark trap and 4 drops of a 1.26% solution of platinum (as chloroplatinic acid) in ethanol. The mixture was heated for 24 hours at xylene reflux (approximately 142° C.) and then filtered.

Both of the epoxy resin copolymer mixtures were heated to 60° C. and then foamed with air from a fritted-glass gas dispersion tube. The foam formed in the first mixture broke down to the surface immediately when the air flow was stopped whereas the foam formed in the second mixture containing the modified copolymer took 60 seconds to break down to the surface when the air flow was stopped.

EXAMPLE 8

A plastisol consisting of 100 g. of a polyvinylchloride resin, 67 g. of dioctyladipate, 33 g. of butylbenzylphthalate, 8 g. of an alkylated polyaromatic hydrocarbon (the latter three components being plasticizers) and 8 g. of a copolymer of $SiO_2$ and $(CH_3)_3SiO_{1/2}$ units in which the ratio of $SiO_2$ units to $(CH_3)_3Si$ units was in the range of 1:0.6 to 1:1.2 was prepared.

The compatibility of the copolymer in the plastisol was checked by the following procedure. To 5 g. of a mixture composed of 75% by weight of dioctyladipate and 25% by weight of butylbenzylphthalate there was added 0.8 g. of a 50% (solids) solution of the copolymer in xylene. The resulting solution or dispersion was cloudy indicating that the copolymer was not completely soluble in the mixture. 5 ml. of xylene was then added to the mixture until it became clear and then the mixture allowed to stand overnight. The next day the mixture was cloudy again so one more ml. of xylene was added until the mixture was clear again and then the total number of milliliters of xylene added, 6.0 ml. is the degree of compatibility. If the copolymer had been completely soluble no xylene (zero ml.) would have been added.

Air was mechanically incorporated into the above plastisol by heating it for about 10 minutes on a Hobart wire whip mixer. A stable foam was produced. This foam was then knife coated, at room temperature, onto an absorbent paper and then the foam cured in a 177° C. oven for about 1 minute. The cured foam was open-celled and the coating only a few mils thick. The paper thus coated was excellent for cleaning purposes and had excellent integrity.

EXAMPLE 9

A plasticol consisting of 6 pounds of a polyvinyl chloride resin, 3 pounds of butylbenzylphthalate, 2 pounds of dioctyladipate, 0.55 pound of an alkylated polyaromatic hydrocarbon, 2 pounds of an epoxidized ester oil and 0.55 pound of a copolymer of $SiO_2$ and $(CH_3)_3SiO_{1/2}$ units in which the ratio of $SiO_2$ units to $(CH_3)_3Si$ units was in the range of 1:0.6 to 1:1.2 was prepared. This plastisol was foamed by expanding it with air employing a commercial Oakes machine. The resulting foam was fused at a temperature of about 149° C. The foam had a density of about 11.5 pounds per cubic foot.

EXAMPLE 10

Two plastisols were prepared which consisted of 100 parts of a polyvinylchloride resin, 100 parts of dioctyladipate and 16 parts of a 50% (solids) solution of a copolymer of $SiO_2$ and $(CH_3)_3SiO_{1/2}$ units in which the ratio of $SiO_2$ units to $(CH_3)_3Si$ units was in the range of 1:0.6 to 1:1.2. The two plastisols differed in that the copolymer used in one had a degree of compatibility of 0 (i.e. it was completely soluble) while the copolymer used in the other had a degree of compatibility of 6.6, both measured by the procedure set forth in Example 8.

Foams were made from both of the above plastisols employing the procedure of Example 8. The foam from the copolymer having 0 degree of compatibility was less stable and when cured had a density of 47.4 pounds per cubic whereas the foam from the copolymer having a degree of compatibility of 6.6 was more stable and had a density of 12.8 pounds per cubic foot when cured.

EXAMPLE 11

A plastisol was prepared which was similar to the one in the preceding example wherein a copolymer having a degree of compatibility of 0 was employed except that the 100 parts of dioctyladipate was replaced with 90 parts of dioctylphthalate and 10 parts of butylbenzylphthalate.

A foam was made from the above plastisol employing the procedure of Example 8. It had a density of 25.4 pounds per cubic foot.

I claim:
1. Paper coated on one side with a composition of
 (A) a cured, open-celled, foam composition comprising
  (1) a plastisol which is a mixture of a particulate thermoplastic vinyl resin or a resinous copolymer of a major portion of such a resin and a minor portion of a copolymerizable monomer, and a high boiling organic liquid plasticizer which is substantially a non-solvent for the particulate resin at ordinary temperatures but is capable of dissolving the resin at elevated temperature to form a single phase material which upon cooling to ordinary temperature is a solid material, and
  (2) at least 0.1% by weight of a copolymer of $SiO_2$ units and units selected from the group consisting of $(CH_3)_3SiO_{1/2}$ and $Q(CH_3)_2SiO_{1/2}$ units, wherein Q is a radical containing a solubilizing group that makes the copolymer compatible with the plastisol, and the ratio of $SiO_2$ units to the total $(CH_3)_3Si$ and $Q(CH_3)_2Si$ units is in the range of 1:0.6 to 1:1.2, and
 (B) an essentially colorless material capable of reacting upon contact witha second essentially colorless material to produce a colored image, the other side of the paper containing said second essentially colorless material.

---
[1] The resin had a viscosity of 11,000–16,000 centipoises, an epoxide equivalent weight of 187–193, a specific gravity of 1.17 and a surface tension of 50 dynes per centimeter.

2. The paper of claim 1 wherein (2) is a copolymer of $SiO_2$ units and $(CH_3)_3SiO_{1/2}$ units.

3. The paper of claim 2 wherein the plastisol (1) consisted essentially of a polyvinyl chloride resin, dioctyladipate and butylbenzylphthalate.

4. Paper coated on one side with about 1 to 10 mils of a composition of
(A) a cured, open-celled, foam composition comprising
(1) a plastisol which is a mixture of a particulate thermoplastic vinyl resin or a resinous copolymer of a major portion of such a resin and a minor portion of a copolymerizable monomer, and a high boiling organic liquid plasticizer which is substantially a non-solvent for the particulate resin at ordinary temperatures but is capable of dissolving the resin at elevated temperature to form a single phase material which upon cooling to ordinary temperature is a solid material, and
(2) at least 0.1% by weight of a copolymer of $SiO_2$ units and units selected from the group consisting of $(CH_3)_3SiO_{1/2}$ and $Q(CH_3)_2SiO_{1/2}$ units, wherein Q is a radical containing a solubilizing group that makes the copolymer compatible with the plastisol, and the ratio of $SiO_2$ units to the total $(CH_3)_3Si$ and $Q(CH_3)_2Si$ units is in the range of 1:0.6 to 1:1.2, and
(B) an essentially colorless material capable of reacting upon contact with a second essentially colorless material to produce a colored image, the other side of the paper containing said second essentially colorless material.

5. The paper of claim 4 wherein (2) was a copolymer of $SiO_2$ units and $(CH_3)_3SiO_{1/2}$ units.

References Cited

UNITED STATES PATENTS

| | | |
|---|---|---|
| 2,885,302 | 5/1959 | Phillpotts. |
| 2,893,890 | 7/1959 | Harvey. |
| 2,939,009 | 5/1960 | Tien. |
| 2,989,493 | 6/1961 | Clark et al. |
| 3,079,351 | 2/1963 | Staneslow et al. |
| 3,330,791 | 7/1967 | Mater et al. |
| 3,511,788 | 5/1970 | Keil. |

MURRAY KATZ, Primary Examiner

U.S. Cl. X.R.

117—36.1, 155, 161; 260—2.5